(12) United States Patent
Krieger

(10) Patent No.: US 6,389,922 B1
(45) Date of Patent: May 21, 2002

(54) CONTROL FOR DRIVE MOTORS FOR A SELF-PROPELLED MACHINE

(75) Inventor: Daniel J. Krieger, Bismarck, ND (US)

(73) Assignee: Clark Equipment Company, Woodcliff Lake, NJ (US)

( * ) Notice: Subject to any disclaimer, the term of this patent is extended or adjusted under 35 U.S.C. 154(b) by 0 days.

(21) Appl. No.: 09/503,573

(22) Filed: Feb. 14, 2000

(51) Int. Cl.⁷ .................. G05G 13/00; B62D 11/04
(52) U.S. Cl. .............. 74/491; 74/471 XY; 74/478; 137/636.2; 180/6.48
(58) Field of Search ............... 74/469, 471 XY, 74/474, 478, 491; 137/636.2; 180/6.48; 477/1

(56) References Cited

U.S. PATENT DOCUMENTS

| | | | |
|---|---|---|---|
| 2,958,233 A | 11/1960 | Johnson | |
| 3,800,615 A | * 4/1974 | Pilch | 74/471 XY |
| 4,043,416 A | * 8/1977 | Albright et al. | 180/6.48 |
| 4,237,752 A | 12/1980 | Hildebrecht | 74/878 |
| 4,310,078 A | * 1/1982 | Shore | 477/1 |
| 4,516,439 A | 5/1985 | Sagaser | 74/470 |
| 4,938,091 A | 7/1990 | Waggoner et al. | 74/471 XY |
| 5,002,454 A | 3/1991 | Hadank et al. | 414/695.5 |
| 5,184,646 A | 2/1993 | Hori et al. | 137/636.2 |
| 5,313,983 A | 5/1994 | Rost et al. | 137/625.6 |
| 5,424,623 A | 6/1995 | Allen et al. | 318/568.18 |
| 5,552,807 A | 9/1996 | Hayes et al. | 345/156 |
| 5,553,992 A | 9/1996 | Ashcroft | 414/685 |
| 5,745,055 A | 4/1998 | Redlich et al. | 341/20 |
| 5,924,516 A | 7/1999 | Sagaser et al. | 180/333 |

* cited by examiner

Primary Examiner—Allan D. Herrmann
(74) Attorney, Agent, or Firm—Westman, Champlin & Kelly, P.A.

(57) ABSTRACT

A drive linkage that is used for controlling valves for the drive motors of an implement or machine, such as an excavator, has a pair of links that can be loaded in tension and compression by manually moving operating levers. The links in turn actuate a cam that tilts a swiveling disk to operate a pilot valve assembly normally used for a joystick control. The links are connected so that the pilot valve can selectively operate motors for driving opposite tracks on sides of the implement in either forward and reverse direction, and wherein motors for both sides can be operated in a forward direction and in a rearward direction. Additionally, each of the drive motors can be controlled so the motor for one side drives in forward direction and simultaneously the motor for the other side drives in reverse direction. A control disk for moving the plungers is operated through a cam plate that is in turn moved by moving the links.

20 Claims, 8 Drawing Sheets

CONTROL FOR DRIVE MOTORS FOR A SELF-PROPELLED MACHINE

BACKGROUND OF THE INVENTION

The present invention relates to the use of a machine ground drive control unit with a dual axis control system (joystick) actuator connected with a cam plate and links for operation by manual levers or foot pedal operating linkages. The cam plate is mounted and positioned such that the drive to a self-propelled machine, such as an excavator can be carried out in several different modes of operation.

In the prior art, skid steer loaders and mini-excavators have used separate hydraulic motors for driving wheels or tracks on each side of the machine. The motors on each side of the machine are controlled by valves that permit the motors to be driven in forward and reverse directions. Individual hand levers, foot levers, and joystick controls have been used for forward and reverse drive and for steering. Generally, the joystick controls are dual axis hydraulic or electric controls operated with short hand operated handles operating an actuator disk to move pilot control valves or electric switches that are mounted directly in the operator's compartment.

Manual levers or foot control levers are preferred for operating the drive train of self-propelled machines such as excavators or loaders, while the convenience of the pilot valves or electric switches used with dual axis joystick controls is desirable. Pilot valves are responsive and compact. The pilot valve assemblies also are high production items that are reasonably priced.

The present invention provides an actuator assembly permitting use of an existing pilot control valve or electric switch normally used with a dual axis joystick control to be used with hand operated levers or foot operated pedals on a self-propelled machine such as an excavator or a skid steer loader for controlling the final drive motors of the machine.

SUMMARY OF THE INVENTION

The present invention relates to a linkage for operating a dual axis control assembly such as a pilot valve assembly or an electrical switch, normally used for joystick control, but modified for operation with individual hand operated levers or pivoted foot operated pedals that load linkage rods in tension and compression. In one aspect, as shown, a standard pilot control valve assembly for hydraulic drives is mounted onto a frame member of a machine, specifically an excavator in the form disclosed, and the hand levers or foot pedals are positioned in an operator's compartment. The pivoting manual control actuators move links that tilt a cam plate that operates the four valves of the pilot control valve assembly selectively to obtain forward, reverse, and directional or steering movement of the controlled drive motors.

The operating cam plate is connected to the linkage through spherical bearings that are positioned in desired locations so that the four pilot valves, which are operated by external plungers arranged at corners of a square layout, can be individually operated. Each of the drive motors can be controlled to drive individually in forward and reverse. The motors also can be simultaneously driven in forward or reverse or can be driven forward on one side of the implement while the opposite side motor is driven in reverse to quickly steer the machine.

The linkage arrangement provides the advantages of an easily operated, compact pilot control valve assembly, normally used for joystick control. The pilot valve can be mounted outside the operator's compartment for actuation by pivoting hand levers or foot pedal controls in the operator's platform of the machine.

Pilot valve assemblies are high volume items, which means that they are relatively low in price. The present invention provides pilot valves for ease of operation, as opposed to operating a main hydraulic control valve that moves a large valve spool directly. Hand and foot operator controls are preferred for drive controls so that a boom, bucket and slew functions of an excavator or boom and buckets of skid steer loader still can be operated with hand controls, as is conventional. The dual axis control also can be used for electrical switch control.

DETAILED DESCRIPTION OF THE ILLUSTRATIVE EMBODIMENTS

Figure 1:
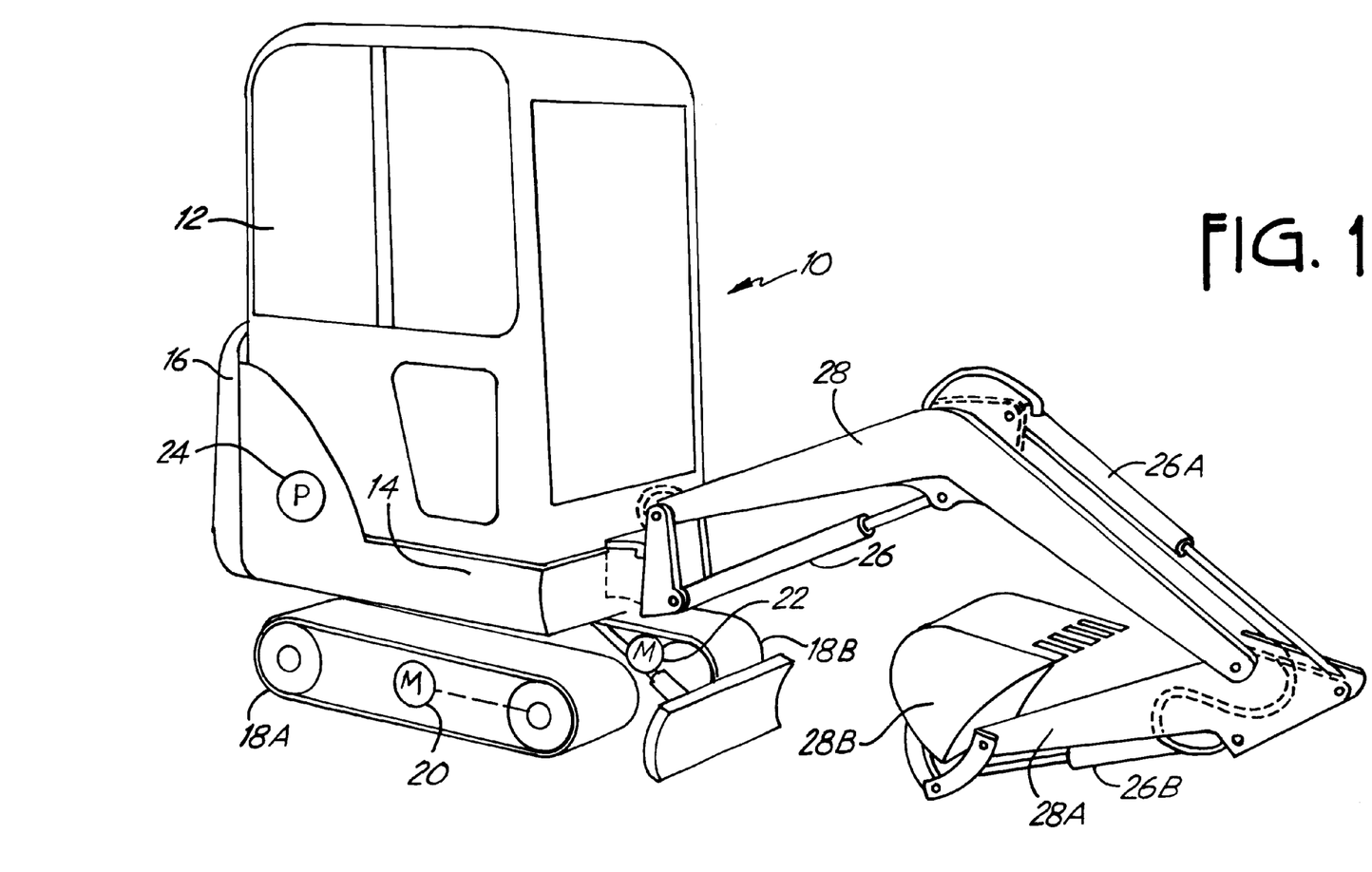
FIG. 1 is a perspective view of an excavator showing a ground drive and operator's compartment and having controls made according to the present invention.

FIG. 1 illustrates an excavator 10 of typical configuration showing an implement or machine on which the present control arrangement is mounted. The excavator 10 includes a operator cab 12 that has a support platform 14, and an engine compartment 16 in which an engine (not shown) is mounted. The excavator has an undercarriage including drive tracks 18A and 18B, which are mounted on suitable sprockets and axles, and which are driven by hydraulic motors 20 and 22, shown schematically. The motors could also be electric, and controlled by a switch assembly. The tracks 18A and 18B on opposite sides of the excavator are used for driving the excavator along the ground and for steering. The excavator can be turned right and left, by selectively driving the motors 20 and 22, which can be driven in forward and rearward directions. The engine in the engine compartment 16 is used for driving various components including a hydraulic pump 24 that will provide hydraulic pressure for not only the drive motors 20 and 22, but also for operating actuators such as the actuator 26 for a boom 28, and other actuators 26A and 26B for a dipper arm 28A and a bucket 28B in a conventional manner. The boom, dipper and bucket are operated in a normal manner, and usually these will be controlled by a conventional joystick control comprising a single handle control for the various functions of the boom and bucket.

Typically, the operator compartment 12 will have the operator drive traction controls in the form of either hand levers or foot pedals, one such control for the drive on each side.

Figure 2:
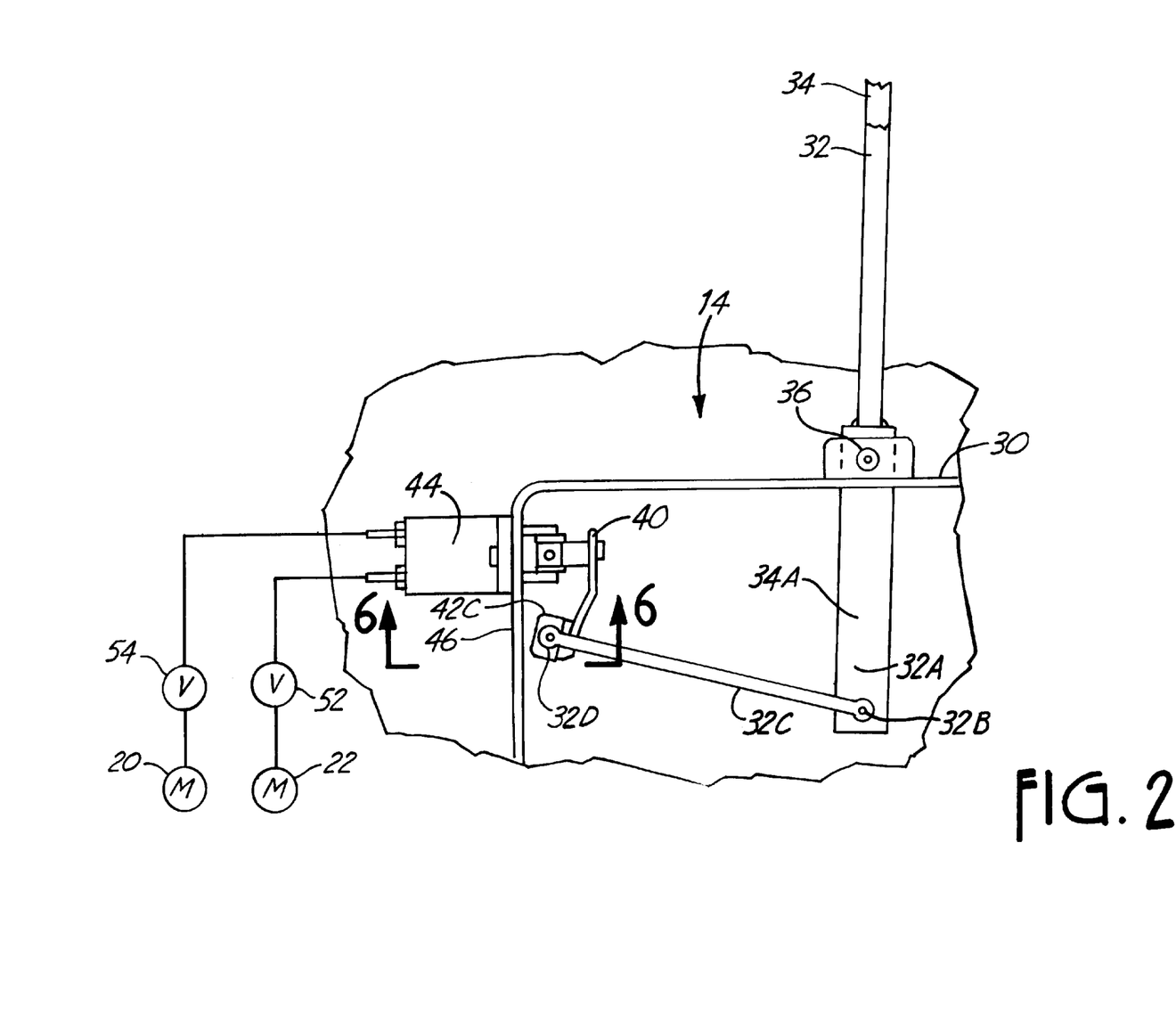
FIG. 2 is a schematic side view of the interior of an operator's compartment of an excavator showing the linkage for operating a pilot control valve of the present invention.

For the sake of convenience, the primary description will be in relation to the use of operator hand levers that are mounted, as schematically shown in FIG. 2, on an operator's platform floor plate 30 on the operator's platform 14. The levers indicated at 32 and 34, respectively, are used for controlling the right and left motors 20 and 22, to selectively control the drive to the tracks 18A and 18B. The hand levers are conventionally used on excavators and skid steer loaders and thus are familiar to operators.

Figure 3:
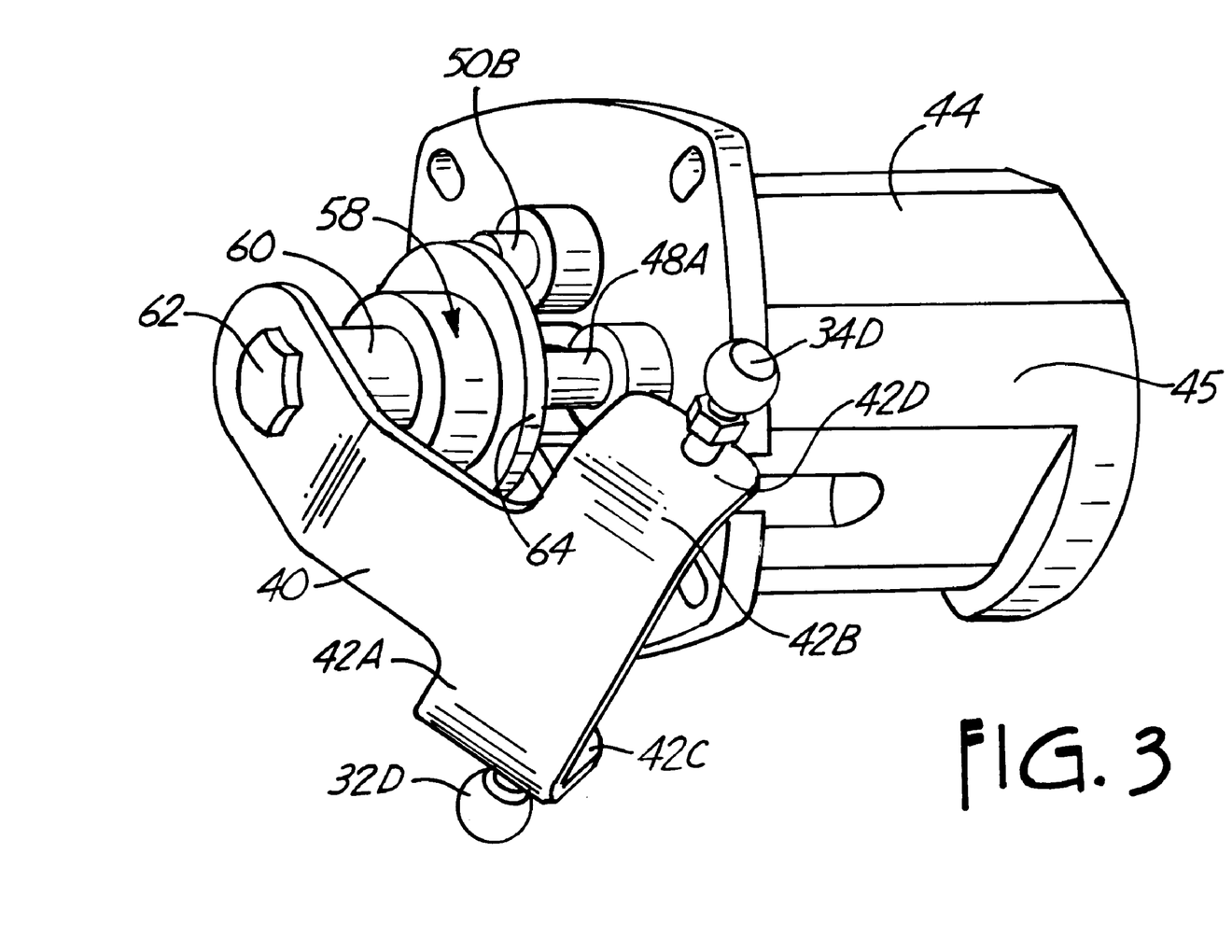
FIG. 3 is a perspective view of a pilot valve assembly shown in FIG. 2 and viewed from an opposite side from FIG. 2.
Figure 6:
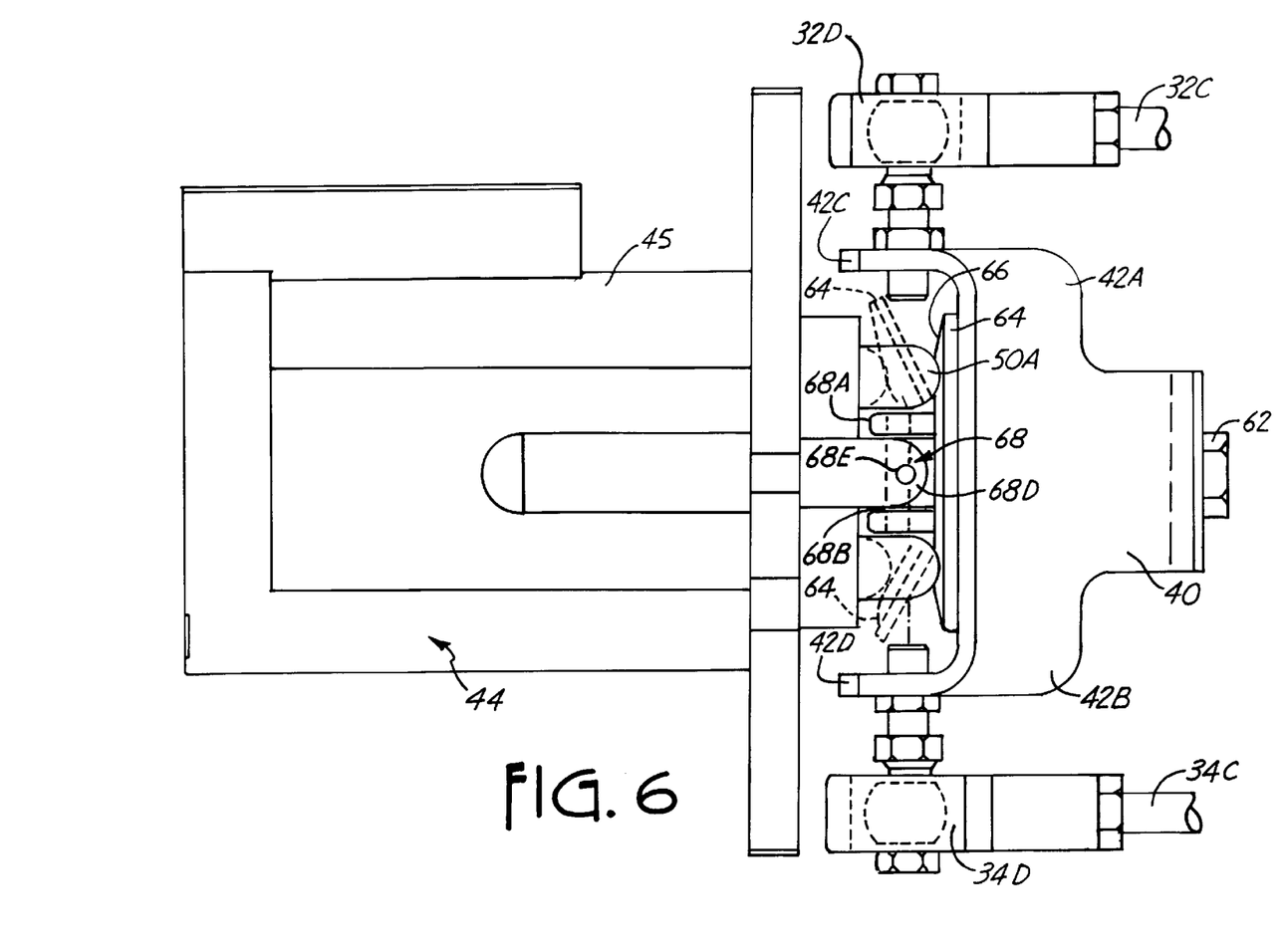
FIG. 6 is a bottom view taken on line 6—6 in FIG. 2.

The levers are spaced apart and are pivotally mounted on suitable supports on the plate 30 about pivot pins shown schematically at 36. The levers are individually controllable by moving the upper ends in fore and aft direction about from a center neutral or rest position the axes of pins 36. The levers in turn move actuator arm ends 32A and 34A respectively which are connected through spherical swivel rod end joints 32B and 34B to links or rods 32C and 34C. The links or rods 32C and 34C in turn have spherical rod ends 32D and 34D at their outer ends, which connect to arms 42A and 42B of a cam plate 40 (see FIG. 3). As can be seen the links 32C and 34C are spaced apart, and the attachment arms 42A and 42B (see FIGS. 3 and 6) include ears 42C and 42D on which the spherical rod end bearings 32D and 34D respectively are mounted. In FIG. 3 the ball members forming part of the spherical rod end bearings are shown without the outer housings.

A standard joystick pilot pressure valve assembly 44 is mounted onto a frame plate 46 of the excavator platform 14. As shown, the joystick operated pilot valve assembly 44 has a body 45 and four control valves that are operated through spring loaded plungers 48A and 48B used to operate the left side motor 22 for the left hand tracks 18B. The plunger 48A is the pilot valve for left forward (LF), and plunger 48B is the pilot valve of reverse (LR). Plungers 50A and 50B are used for controlling the right side motor 20 and driving the right track 18A. The plunger 50A is the pilot valve for right forward (RF) and plunger 50B is the pilot valve for right reverse (RR). The pilot valves operate hydraulic valve controls 52 and 54 (schematically shown in FIG. 2) that control direction of rotation of the motors 20 and 22.

The pilot operated valves that are operated by the plungers 48A, 48B, 50A and 50B, are used conventionally with joystick controls for various hydraulic circuits. When used for the traction drive of an implement, they are connected to operate controls for each of the motors as illustrated in FIG. 2. The control valve 52 is operated by pilot valve plungers 48A and 48B for operating a left side motor shown schematically at 22, and the pilot valve plunger 50A and 50B operate a control valve 54 for operating the right side motor 20. The valves 52 and 54 are operable so that the respective motor will rotate either in forward or reverse direction, and as can be seen each motor 20 and 22 is individually controlled. The speed of rotation of the motors is separately controlled. For example, a swash plate control can be used. The pilot valves control on/off (neutral) and direction of rotation of the motors.

The cam plate 40 is mounted onto a pilot valve operating disk assembly 58, that has a center body 60 on which the cam plate 40 is securely mounted with a cap screw 62. The disk assembly 58 includes an annular actuating flange 64 at the lower end of the center body 60 that engages the hemispherical ends of the plungers 48A, 48B, 50A and 50B. The annular flange 64 has a rounded or tapered undersurface 66 that will ride against part spherical ends of the plungers to provide actuation of the plungers axially inward against a spring load that loads the plungers outwardly, when the disk assembly 58 is tilted.

Figure 4:
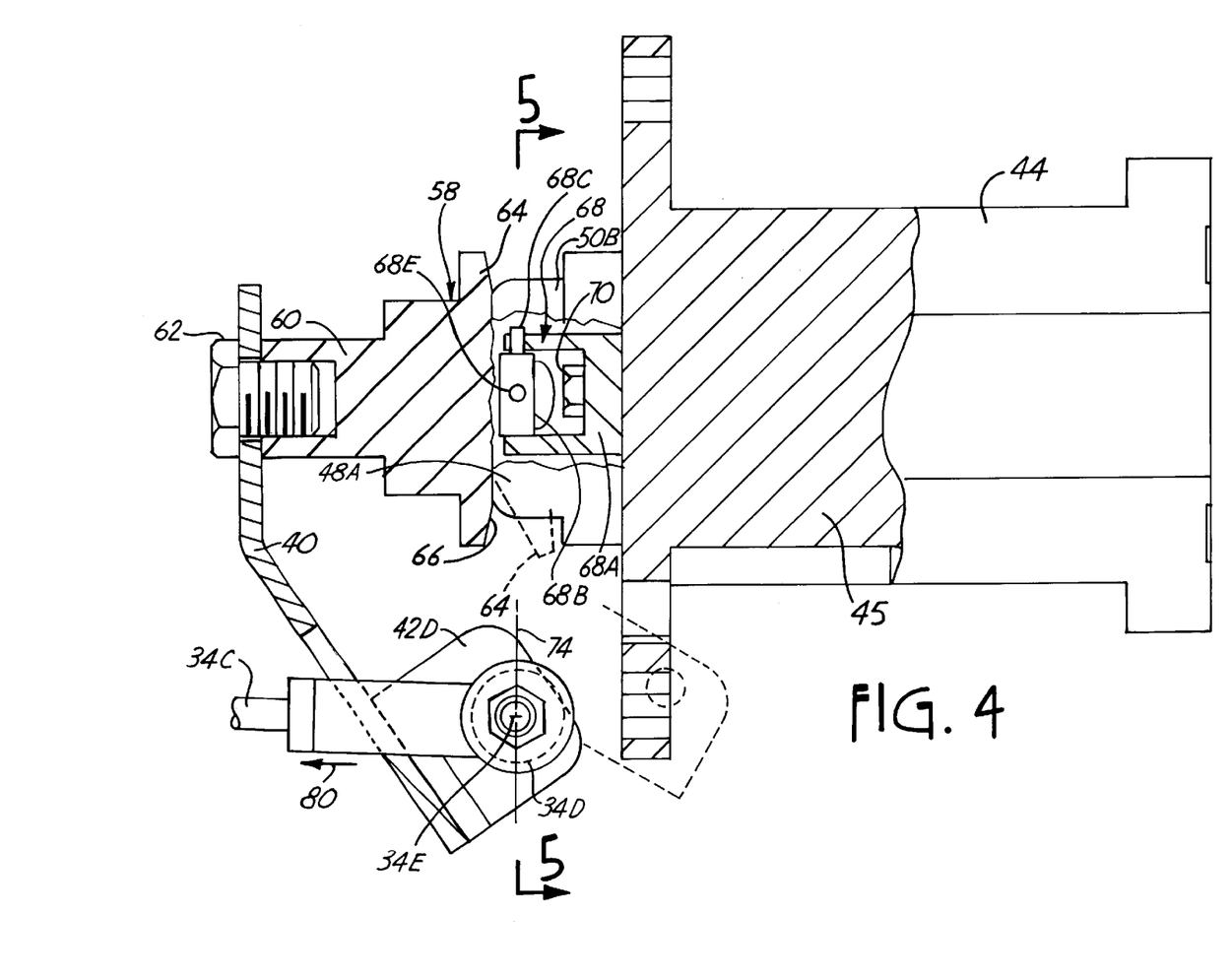
FIG. 4 is an enlarged side view of the pilot valve and cam operator of FIG. 3 with parts in section and parts broken away.

The disk assembly 58 is mounted to the pilot valve body 44 through a universal joint or spherical joint indicated generally at 68. This joint, as shown, is a universally pivoting joint having a first yoke 68A that is fixed to the valve body 44 with a cap screw 70 (FIG. 4). The yoke 68A pivotally mounts a swivel block 68B on suitable pivot pins 68C. A second yoke 68D is fixed to the body 60, that supports the flange 64 and has a yoke 68D that is pivotally mounted to the block 68B on pins 68E, which are on an axis perpendicular to the axis of pivot pins 68C.

The universal joint 68 permits universal pivoting of the disk assembly 58 about the mutually perpendicular axes of the pins 68C and 68E. When the disk assembly 58 tilts, the flange 64 will tilt and a section of the flange will depress one or more of the plungers 48A, 48B and 50A and 50B under control of the levers 32 and 34. This tilt is illustrated in dotted lines in FIGS. 4 and 6.

The center points 32E and 34E of the part spherical balls of rod ends 32D and 34D that mount onto the cam plate arms 42 and 42A are positioned to permit the desired actuation of the plungers. The center points 32E and 34E of the spherical joints lie on the plane 74 that is defined by the axes of the pins 68C and 68E of the universal joint 68 when in a centered or reference position. This is illustrated in FIG. 4.

Figure 5:
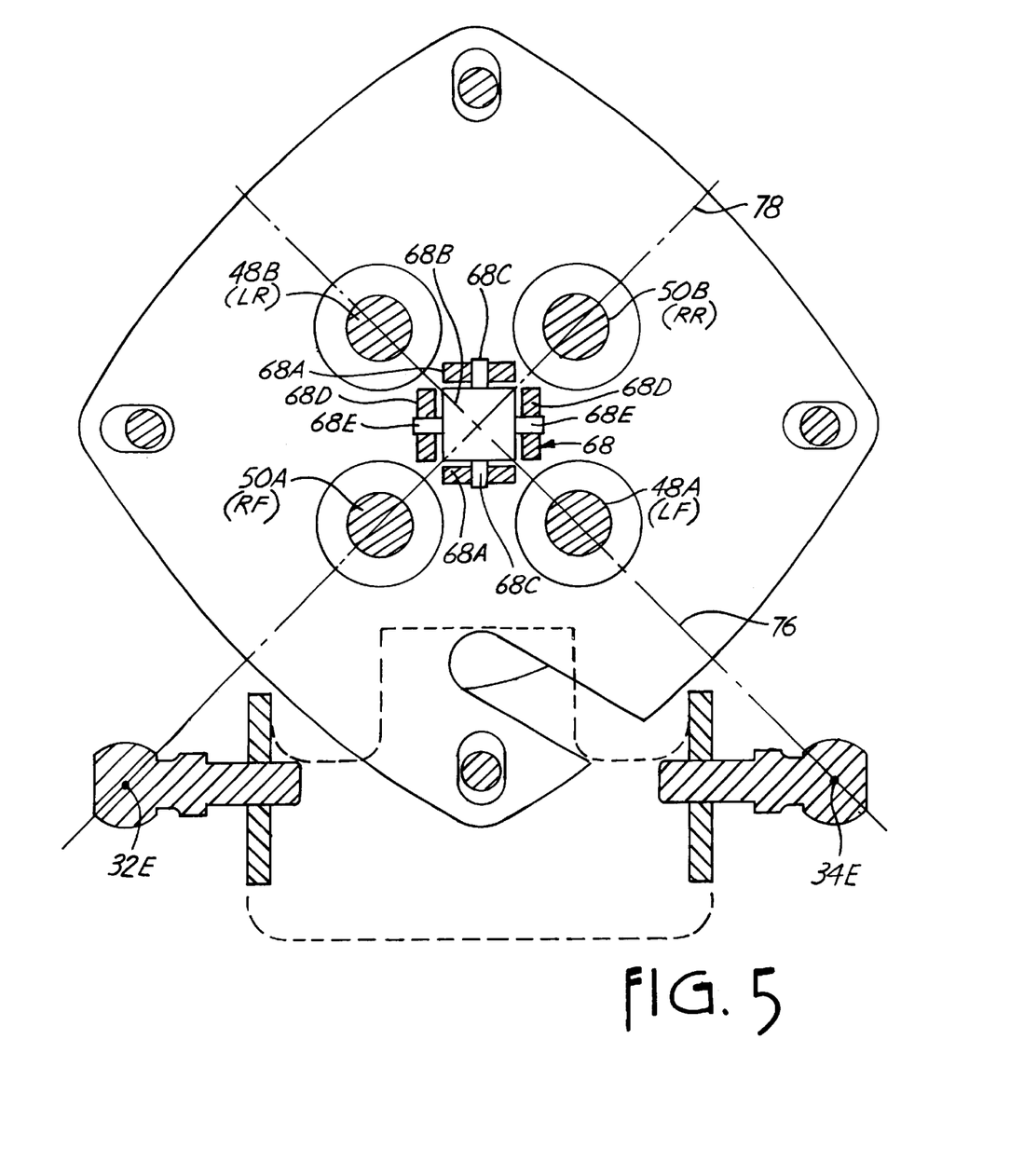
FIG. 5 is an end sectional view taken on line 5—5 in FIG. 4.

Additionally, in order to obtain the needed motions, the center points 32E and 34E of the part spherical joint rod ends 32D and 34D lie along the lines that pass diagonally across the centers of the plungers at the opposite corners of the valve body and through the center of swivel of universal swivel joint 68. For example, as shown in FIG. 5, a line 76 passes through the center axis of the plunger 48A, the center axis of the plunger 48B, the swivel center of the universal or swivel joint 68 and through the swivel center or center point 34E of the spherical swivel rod end 34D. A line 78 passes through the center axis of the plunger 50A, the center axis of the plunger 50B, the swivel center of the universal or swivel joint 68 and the swivel center or center point of the spherical swivel rod end 32D.

The control motions can be explained by first referring to FIGS. 2, 4 and 5. When both of the manual levers 32 and 34 are pulled rearwardly, the links 32C and 34C will be placed under tension and will pull the arms 42A and 42B of the cam plate 40 in the direction that is indicated by the arrow 80 in FIG. 4.

This will swivel the flange 64 about the swivel center of universal swivel joint 68 to depress both of the plungers 48B and 50B, and both of the motors 20 and 22 will drive the respective tracks 18A and 18B in reverse so that the implement or machine, as shown an excavator, will move rearwardly.

If the levers 32 and 34 are pushed forwardly, the links 32C and 34C will be placed under compression, and the arms 42A and 42B of the cam plate 40 will move in an opposite direction from the arrow 80 and will cause the plungers 48A and 50A to be depressed simultaneously thereby operating the main valves 52 and 54 to drive the motors 20 and 22, and causing the tracks 18A and 18B to drive the excavator in forward direction, without turning.

Figures 7A, 7B, 7C, 7D:
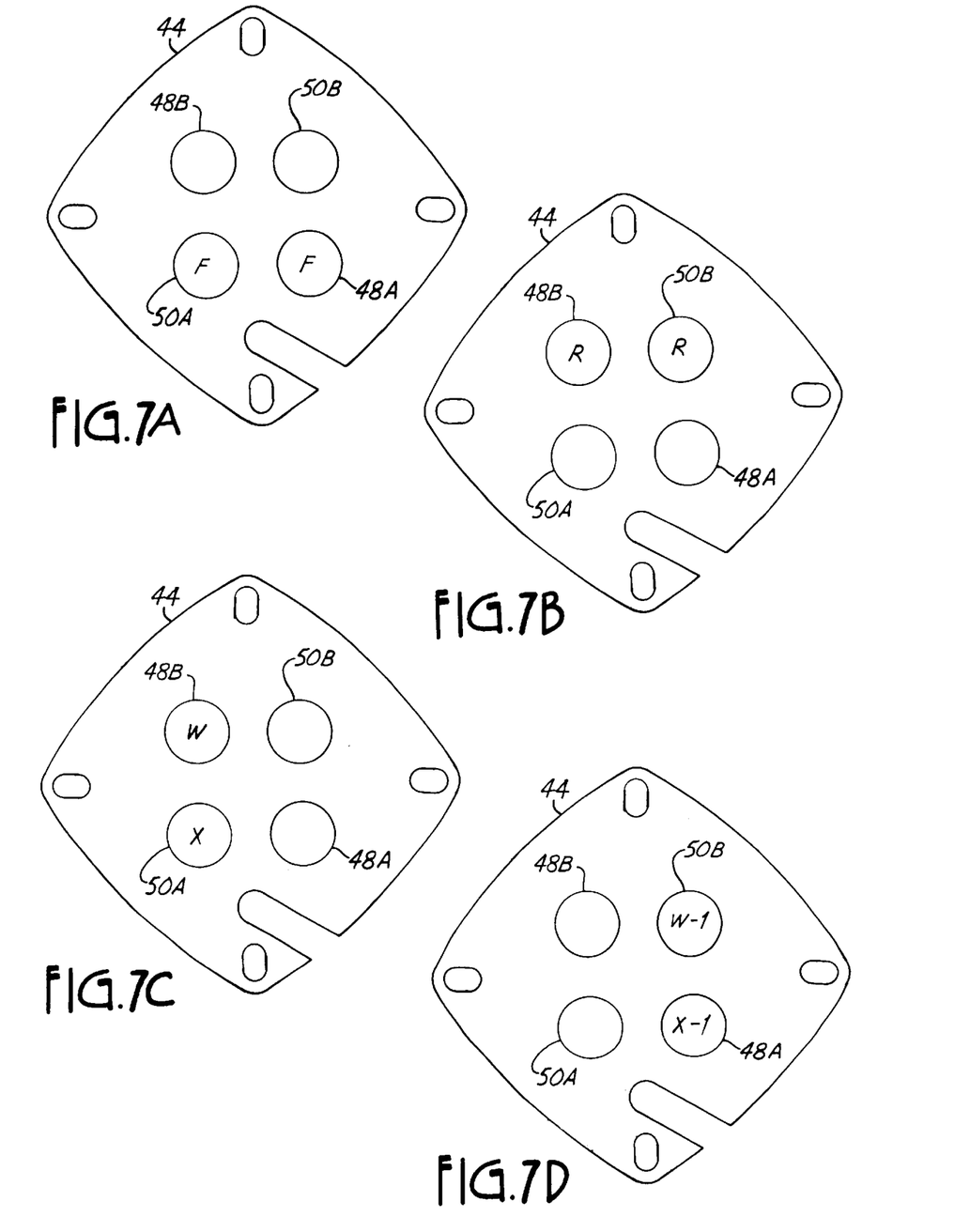
FIGS. 7A through 7D are illustrative end views similar to FIG. 5 of the end of a pilot valve assembly showing actuating plungers which are moved to provide actuating pressures from the pilot valve to the machine drive motors and illustrating the different operational drive combinations that can be achieved with the cam operator of the present invention.

Referring to FIGS. 7A and 7B, the forward and reverse drive positions are illustrated. In FIG. 7A, the plungers 48A and 50A are marked with an "F" in that the plungers are moved inwardly for forward direction. In FIG. 7B, the plungers 48B and 50B are marked with an "R" indicating that they are actuated inwardly to cause rearward movement of the excavator.

If only the lever 32 is pushed forwardly, the link 32C would push on the cam arm 42A, and this then would cause a tilting pivoting of the cam plate 40 about the swivel center of universal swivel joint 68, but since the spherical rod end 34D remains stationary, the cam plate 40 would also pivot about swivel center point 34E, and would cause the plunger 50A to be depressed as indicated by the X in FIG. 7C. The drive would then be forward on the right side motor 20 driving track 18A to cause turning to the left of the machine with only the right track being driven and the other remaining stationary.

The same direction of turn can be obtained by reversing the left hand drive motor for the left hand drive track. With lever 32 in neutral or centered position the lever 34 would be pulled back, placing tension on the rod 34C, pulling on arm 42B and rocking the cam 40 about the swivel center point 32E of rod end 32D and the swivel center of joint 68 to depress plunger 48B which is indicated with a W in FIG. 7C.

A left turn can be made by driving the right hand track forwardly or by actuating the plunger 48B and driving the left hand track rearwardly. To accelerate the rate of turn, one track can be driven forwardly and one track rearwardly at the same time. The pivoting on the spherical ball joints of the rod ends when the actuation is being carried out, so that for example if the turn is to the left, and the left hand reverse plunger 48B is depressed, the right hand forward movement plunger 50A also can be depressed, by pushing the lever 32 forwardly. The cam plate then tilts to the left in FIGS. 7A–7D about the swivel center of universal swivel joint 68 to depress both plungers 50A and 48B simultaneously (labeled "W" and "X" in FIG. 7C).

If it is desired to turn to the right, the lever 32 can be pulled rearwardly to cause plunger 50B to be depressed to reverse the right track 18A (labeled "W-1" in FIG. 7D), or lever 34 can be moved forwardly to depress plunger 48A and drive the left track forwardly (labeled "X-1" in FIG. 7D).

To turn right at a higher rate, or a tighter turn, in addition to running the right motor in a rearward direction, the left forward 48A can be depressed by pushing the lever 34 to the front, at the same time the lever 32 is pulled rearwardly to tilt the disk 64 to drive the tracks in opposite directions. The cam plate would tilt to the right side in FIGS. 7A–7D about the swivel center of universal swivel joint 68 (labeled "W-1" and "X-1" in FIG. 7D).

The pivoting on the spherical swivel rod ends 32D and 34D permits this multiple position operation. The alignment of the centers of swivel of the spherical rod ends on diagonal lines that pass through the centers of the diagonal plungers and the swivel center of universal swivel joint 68 places the pivots in proper location.

Figure 8:
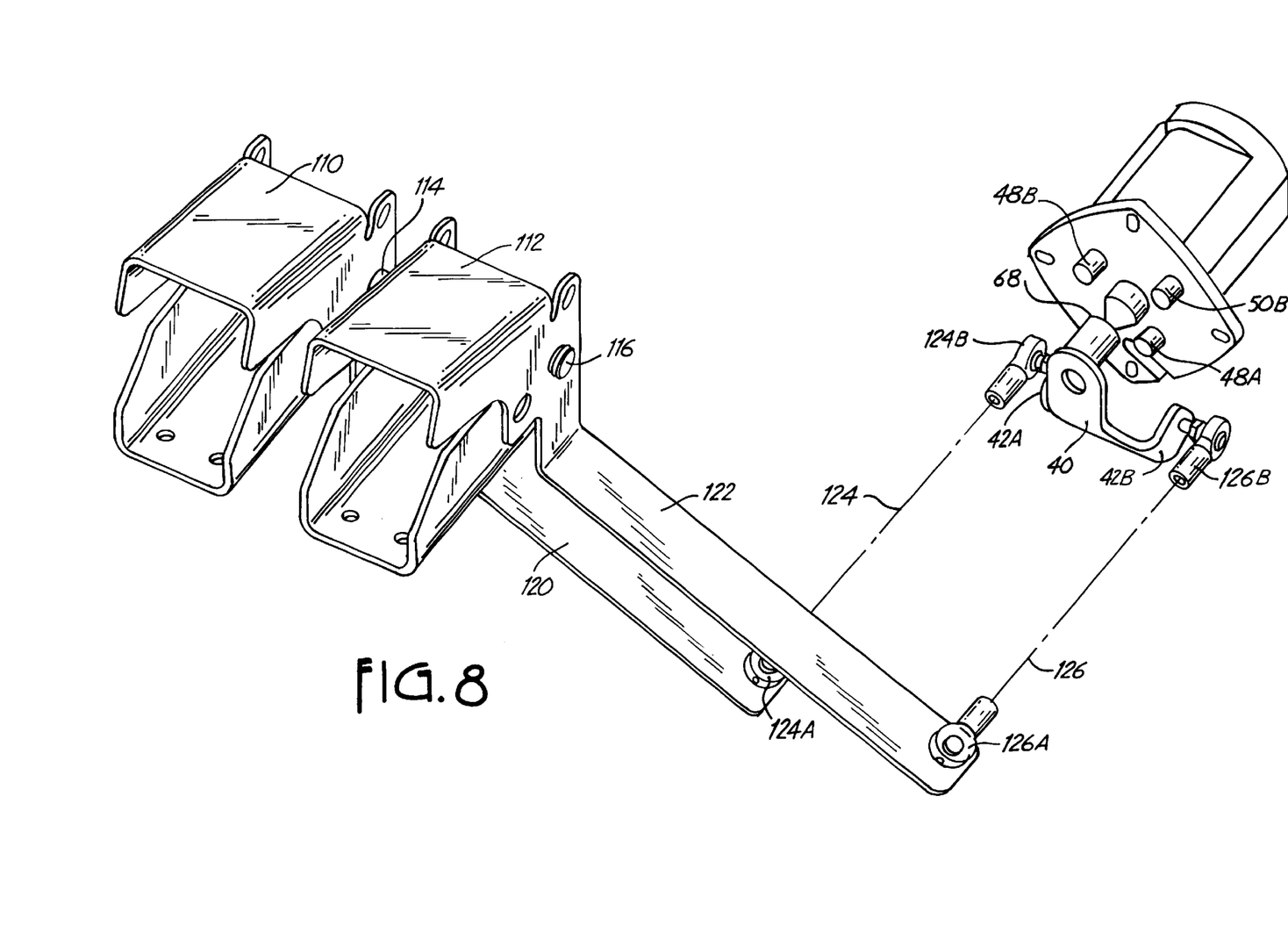
FIG. 8 is a schematic perspective view of a modified control linkage used with the present invention.

In FIG. 8 a schematic perspective representation of the operation of the links and the cam and pilot valves using pivoting foot pedals is illustrated. This is only a schematic showing, but a pair of foot pedals are shown at 110 and 112, respectively, which are pivotally mounted to a support with pivot pins 114 and 116. Each of these pedals can be pivoted from a neutral position so the toe end would lower, and from the neutral position so the trailing or heel end would lower. Levers 120 and 122 are mounted to move with the foot pedals and connect to rods 124 and 126 through spherical swivel joint rod end 124A and 126A. The foot pedals load the links 124 and 126, respectively, in tension and compression.

Spherical swivel joint rod ends 124B and 126B connect the rods 124 and 126 to the arms 42A and 42B of the cam plate 40 as was previously shown. The spherical or universal swivel joint 68 is illustrated schematically in FIG. 8. The disk that operates the plungers is not illustrated in FIG. 8. However, the plungers are positioned in the same location, and are moved as the disk 64 tilts in the same manner as before. The only difference is that the pivoting manual actuators are foot pedals rather than hand levers.

The stroke lengths of the rods controlled by the hand levers or foot pedals can be selected as desired to insure proper operation. Thus, by using universal swivel joints or spherical joints at the center of the actuator disk 64 and at arms 42A and 42B, the needed motion can be obtained.

The action of the cam plate permits nine modes of operation, namely: (a) stopped or neutral; (b) both tracks driven forwardly; (c) both tracks driven rearwardly; (d) right track forward; (e) right track reversed; (f) left track forward; (g) left track reversed; (h) left track forward and simultaneously right track reversed; and (i) right track forward and left track reversed.

Precise, low cost control is achieved.

It is apparent that with minor modifications to the cam plate orientation and linkage connections forward travel can be obtained by putting links 32C and 34C into tension instead of compression, and rearward travel then would be obtained with links 32C and 34C in compression, rather than tension.

The term "plungers" is defined to include movable electrical switch elements, that switch electrical power upon movement of a universally mounted swivel member, such as a disk, as shown.

Although the present invention has been described with reference to preferred embodiments, workers skilled in the art will recognize that changes may be made in form and detail without departing from the spirit and scope of the invention.

What is claimed is:

1. An actuator linkage for operating a control having a body supporting a plurality of axially actuatable plungers located spaced from a central axis of the body, an actuator disk joined to the body at a central location relative to the plungers, said disk being connected to the body through a universal swivel joint permitting universal swiveling, a pair of arms that are spaced apart connected to the disk and extend to one side of the body, operating links connected to each of the arms, and remotely operable actuators for moving the links axially, said links exerting a force on the respective arm to pivot the actuator disk to depress at least a selected one of said plungers.

2. The linkage of claim 1, wherein said links are connected to said arms through link swivel joints.

3. The linkage of claim 1, wherein there are a plurality of plungers symmetrically located about the central axis.

4. The linkage of claim 2, wherein said actuator disk pivots about the link swivel joint of one of the links when an opposite link is moved axially to selectively provide tension and compression to the arm connected to the opposite link.

5. The linkage of claim 3, wherein there are four plungers on the body arranged in a square pattern, said plungers having central axes and being positioned with the central axes of the positioned plungers at diagonally opposite corners of the square pattern, the central axes of diagonally opposite plungers passing through a line that passes through a center of swivel of a link swivel joint.

6. The linkage of claim 5, wherein the universal swivel joint is positioned so a swivel center of the universal swivel joint lies on the lines passing through the axes of diagonally opposite plungers.

7. The linkage of claim 2, wherein said plungers are arranged at corners of a square pattern and the arms of said cam plate are positioned so that the lines passing through the axes of diagonally opposite plungers pass through the center of the universal joint and through a respective center of swivel of the link swivel joints connecting the links to the respective arms.

8. The linkage of claim 7, wherein said links are actuated with pivoting manual control levers, and wherein the plungers are spring loaded to a rest position and are movable in a direction toward the body by the actuator disk.

9. The linkage of claim 7, wherein said links are actuated by pivoting manually operated levers by hands of an operator.

10. The linkage of claim 7, wherein said links are actuated by pivoting manually operated foot pedals.

11. The linkage of claim 1, wherein said control comprises a pilot valve assembly used for controlling motors for a ground drive of a machine.

12. The apparatus of claim 11, wherein said pilot valve assembly is connected to control motors for driving tracks of an excavator.

13. The linkage of claim 2, wherein the universal swivel joint has a swivel center point, and the link swivel joints have swivel center points, the swivel center points lying on a plane perpendicular to central axes of the plungers in a rest position of the actuator plate.

14. An improvement for use with a pilot valve assembly having a valve body and a plurality of actuatable axially moveable plungers symmetrically located around a central axis, an actuator disk for engaging the plungers from a rest position to an operable position, and an actuator swivel joint mounting the actuator disk to the valve body, wherein the improvement comprises a cam plate mounted on said actuator disk and having a pair of arms that are spaced from the central axis an equal distance, and are spaced laterally from each other, and manually actuatable links to apply forces in directions parallel to the axis of the plungers in both directions of movement from a rest position, said links being connected to the arms through link universal swivel joints.

15. The improvement of claim 14, wherein the link universal swivel joints have a center of swivel, and the actuator swivel joint has a center of swivel, the centers of swivel defining a plane that is perpendicular to the axes of the plungers with the actuator disk in the rest position.

16. The improvement of claim 14, wherein there are four plungers on the valve body, arranged in a square pattern, with the plungers being positioned at corners of the square pattern, the central axes of the plungers at diagonally opposite corners of the square pattern, lying along crossing lines passing through centers of swivel of the respective link universal swivel joints.

17. The improvement of claim 16, wherein the actuator swivel joint is positioned with a center of swivel of the actuator swivel joint being located on the intersection point of the intersecting lines.

18. The improvement of claim 14, wherein the link universal swivel joints connecting the links to said arms are spaced equal distances on opposite sides of a bisecting plane passing through a central axis of the square pattern and through a center of swivel of the actuator swivel joint.

19. An actuator linkage for operating a control having a body supporting a plurality of control members having a normal position that change state upon axial movement, the control members being located spaced from a central axis of the body, an actuator, a universal swivel joint connecting the actuator to the body at a central location relative to the control members, the swivel joint permitting universal swiveling of the actuator, a pair of arms that are spaced apart being connected to the actuator and extending to one side of the body, operating links connected to each of the arms, and remote operators for moving the links axially, said links exerting a force on the respective arm to pivot the actuator to move at least a selected one of said control members.

20. The linkage of claim 19, wherein the plurality of control members are slidably mounted on the body.

* * * * *